United States Patent
Raynaud

(10) Patent No.: US 9,436,757 B1
(45) Date of Patent: Sep. 6, 2016

(54) GENERATING A GRAPH FOR A USER PROFILE

(71) Applicant: Google Inc., Mountain View, CA (US)

(72) Inventor: Daniel Raynaud, Cupertino, CA (US)

(73) Assignee: Google Inc., Mountain View, CA (US)

(*) Notice: Subject to any disclaimer, the term of this patent is extended or adjusted under 35 U.S.C. 154(b) by 389 days.

(21) Appl. No.: 14/229,790

(22) Filed: Mar. 28, 2014

(51) Int. Cl.
*G06F 17/30* (2006.01)

(52) U.S. Cl.
CPC ... *G06F 17/30598* (2013.01); *G06F 17/30705* (2013.01); *G06F 17/30713* (2013.01)

(58) Field of Classification Search
CPC .................. G06F 17/30867; G06F 17/30766; G06F 17/30241; G06F 17/30699; G06F 17/30705; G06F 17/30029
USPC .................. 707/740, 752, 709, 726
See application file for complete search history.

(56) References Cited

U.S. PATENT DOCUMENTS

| 8,489,596 B1 | 7/2013 | Milton et al. |
| 8,635,267 B2 | 1/2014 | Schmidt |
| 2011/0173264 A1* | 7/2011 | Kelly ............... G06Q 10/10 709/205 |
| 2012/0124176 A1 | 5/2012 | Curtis et al. |
| 2013/0055056 A1* | 2/2013 | Sabur .............. G06F 17/30867 715/205 |
| 2013/0232263 A1* | 9/2013 | Kelly ............... H04L 43/10 709/224 |

FOREIGN PATENT DOCUMENTS

WO    2013/045751 A1    4/2013

* cited by examiner

*Primary Examiner* — Monica Pyo
(74) *Attorney, Agent, or Firm* — McDermott Will & Emery LLP

(57) ABSTRACT

According to various aspects of the subject technology, a user's personality profile is based on a user's social actions, including uploading a photo in association with a post (e.g. check-in, comment, reshare, etc.). The post's content (e.g. photo) is attributed to one or more personality dimensions in the user's personality profile. The various personality dimensions are then displayed in a compass graph, which shows user achievement on a multi-dimensional scale. Each discreet, explicit submission alters, to some degree, one or more dimensions. The compass graph is publicly viewable, and users can see the profile change over time, as each user action updates the compass graph. The dimensions can also be altered by the number of posts, time, locations of posts, subject matter (e.g. types of posts or categories of posts), and external interaction such as social interactions (e.g. feedback on posts, or positive comments).

20 Claims, 6 Drawing Sheets

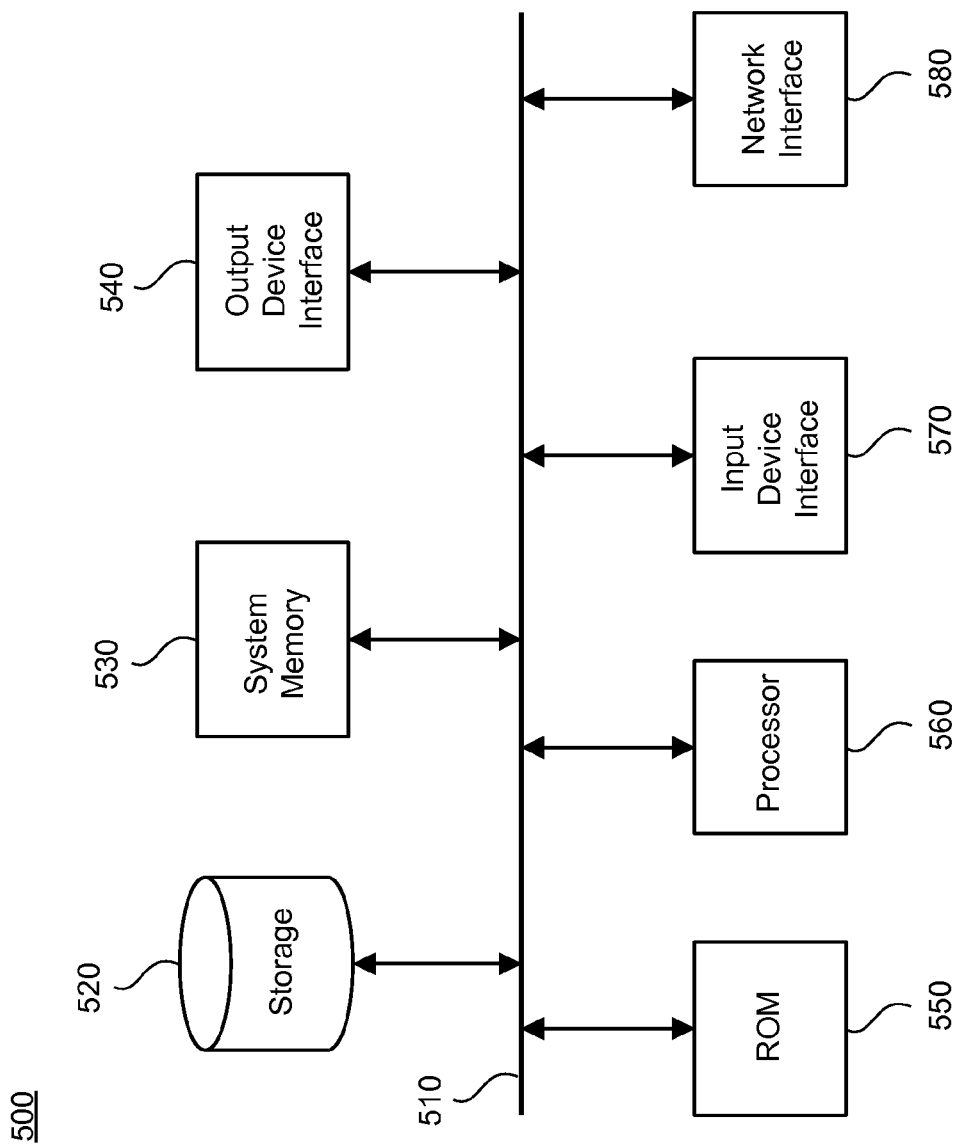

GENERATING A GRAPH FOR A USER PROFILE

BACKGROUND

The present disclosure relates generally to aggregating social actions and more particularly to methods and systems for generating a personality profile based on social actions without requiring a user to answer questions.

Social network users often post content onto social networks, such as uploading photos while checking into locations. For example, users often photo check-in to a restaurant by uploading a photo of the food they are about to eat together with checking in at the restaurant. The social networks may award badges or similar awards based on a number of check-ins or amount of user activity. The social networks may further track user activity for purposes of targeted advertising. In addition, many users enjoy quizzes or apps that identify the user's personality or skills based on a questionnaire. However, these questionnaires require users to actively fill out the questionnaire or otherwise answer a series of questions in order to determine the user's personality.

SUMMARY

Aspects of the subject technology relate to a computer-implemented method. The method includes providing for a user profile having a plurality of dimensions, the plurality of dimensions respectively corresponding to a plurality of categories, and receiving user activity data corresponding to at least one user action. The method further includes associating the user activity data to at least one of the plurality of categories, and updating the plurality of dimensions based on the association of the user activity data to the at least one of the plurality of categories. The method further includes generating a graph based on the user profile data. The graph includes a center point, and a plurality of axes radiating outward from the center point, the plurality of axes respectively corresponding to the plurality of dimensions. The graph further includes a plurality of dimension points, each of the plurality of dimension points plotted along each of the plurality of axes respectively. A distance between each of the dimension points and the center point corresponds to a measure of user activity in each of the plurality of categories respectively.

Aspects of the subject technology also relate to a non-transitory machine-readable medium including instructions stored therein, which when executed by a machine, cause the machine to perform operations. The operations include providing for a user profile having a plurality of dimensions, the plurality of dimensions respectively corresponding to a plurality of categories, and receiving user activity data corresponding to at least one user action. The operations further include associating the user activity data to at least one of the plurality of categories, and updating the plurality of dimensions based on the association of the user activity data to the at least one of the plurality of categories. The operations further include generating a graph based on the user profile data. The graph includes a center point, and a plurality of axes radiating outward from the center point, the plurality of axes respectively corresponding to the plurality of dimensions. The graph further includes a plurality of dimension points, each of the plurality of dimension points plotted along each of the plurality of axes respectively. A distance between each of the dimension points and the center point corresponds to measure of user activity in each of the plurality of categories respectively.

Aspects of the subject technology also relate to a system. The system includes one or more processors and a non-transitory computer-readable medium comprising instructions stored therein, which, when executed by the one or more processors, cause the one or more processors to perform operations. The operations include providing for a user profile having a plurality of dimensions, the plurality of dimensions respectively corresponding to a plurality of categories, and receiving user activity data corresponding to at least one user action. The operations further include associating the user activity data to at least one of the plurality of categories, and updating the plurality of dimensions based on the association of the user activity data to the at least one of the plurality of categories. The operations further include generating a graph based on the user profile data. The graph includes a center point, and a plurality of axes radiating outward from the center point, the plurality of axes respectively corresponding to the plurality of dimensions. The graph further includes a plurality of dimension points, each of the plurality of dimension points plotted along each of the plurality of axes respectively. A distance between each of the dimension points and the center point corresponds to a measure of user activity in each of the plurality of categories respectively.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

FIG. 5 shows a diagram of an electronic system according to example aspects of the present disclosure.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

In accordance with one or more implementations, methods and systems for creating a personality profile based on social actions are described. In one or more implementations, a user's social actions may be aggregated and categorized to plot achievement levels along various dimensions.

Figure 1:
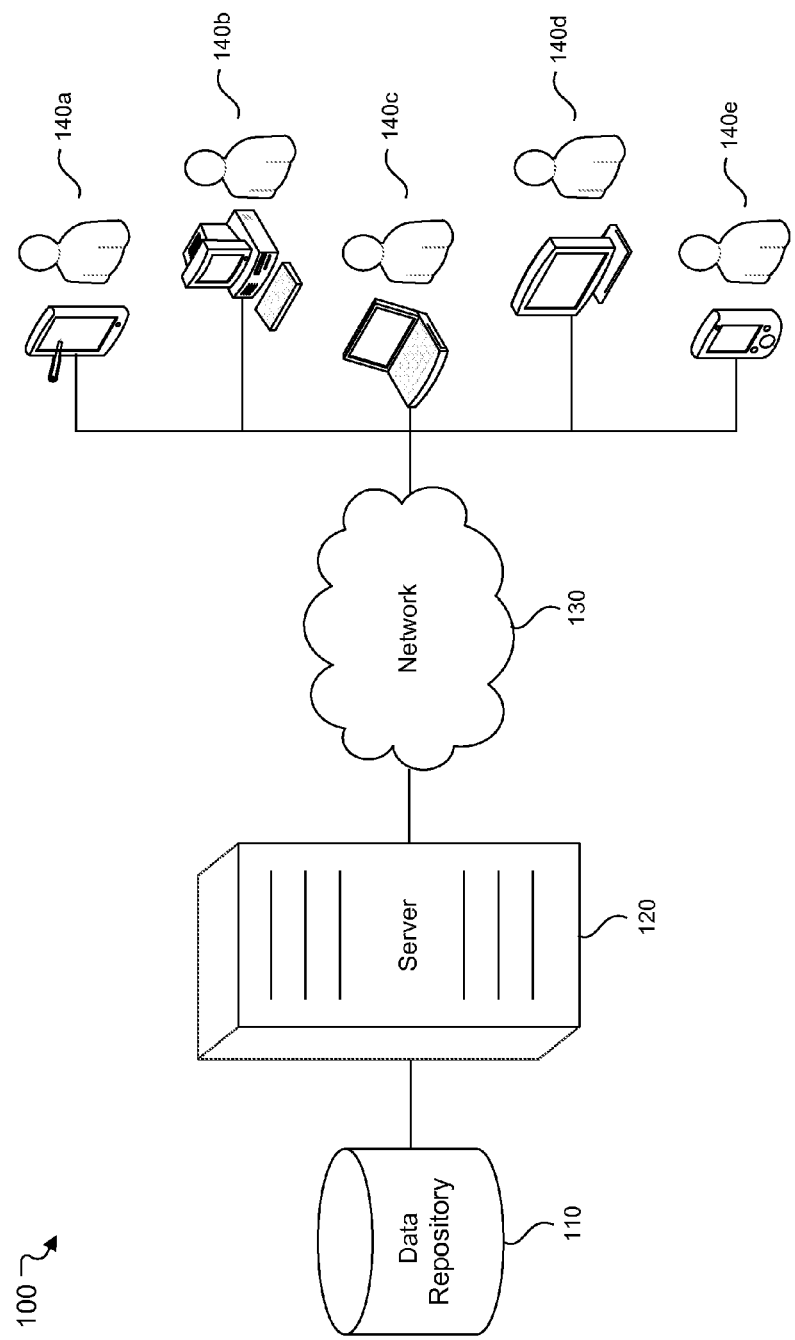
FIG. 1 depicts a network environment according to example aspects of the present disclosure.

FIG. 1 illustrates an example network environment 100 with which some implementations of the subject technology can be implemented. The network environment 100 includes a data repository 110 (e.g., a computer-readable storage media) for storing a variety of data accessible by web-based applications. While the network environment 100 includes a single data repository 110 in FIG. 1, the network environment 100 may include additional data repositories in some implementations. The data repository 110 may store, for example, social network webpages, social action data, user profiles, including achievement levels along various dimensions, user activity data, and so forth.

The network environment 100 further includes a server 120. In some example aspects, the server 120 can be a single computing device, for example, a computer server. In other embodiments, the server 120 can represent more than one computing device working together to perform the actions of a server (e.g., a server farm).

Client devices 140a, 140b, 140c, 140d, and 140e represent various forms of processing devices. Examples of a processing device include a desktop computer, a laptop computer, a handheld computer, a tablet computer, a television coupled to a processor or having a processor embedded therein, a personal digital assistant (PDA), a network appliance, a camera, a smart phone, a media player, a navigation device, an email device, a game console, or a combination of any of these data processing devices or other data processing devices.

Each of the client devices 140a-140e may be any system or device having a processor, a memory, and communications capability. Further, each of client devices 140a-140e can represent various forms of servers including, but not limited to a web server, an application server, a proxy server, a network server, or a server farm. In some aspects, client devices 140a-140e may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

The server 120 and the client devices 140a-140e may be communicatively coupled through a network 130. In some implementations, client devices 140a-140e may request data from server 120. For example, a client device (e.g., the client device 140a) may request server 120 to provide a web document to a web browser of the client device, for which server 120 retrieves and sends the web page. In some implementations, client device 140a-140e may send data to the server 120. For example, a client device (e.g. the client device 140a) may upload user generated content (UGC) to a social network accessible through the server 120. In some aspects, network environment 100 can be a distributed client/server system that spans one or more networks such as network 130. Network 130 can be a large computer network, including a local area network (LAN), wide area network (WAN), the Internet, a cellular network, or a combination thereof connecting any number of mobile clients, fixed clients, and servers. In some aspects, each client (e.g., client devices 140a-140e) can communicate with servers 120 via a virtual private network (VPN), Secure Shell (SSH) tunnel, or other secure network connection. In some aspects, network 130 may further include a corporate network (e.g., intranet) and one or more wireless access points.

Figure 2A:
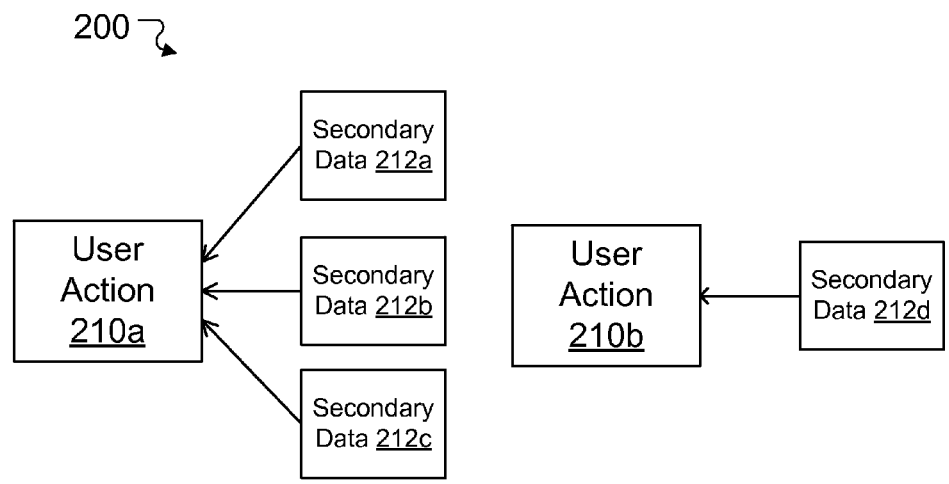
FIG. 2A illustrates a user activity data according to example aspects of the present disclosure.

In example aspects, the client devices 140a-140e communicate with the server 120 to access a social network. A user of a client device (e.g. the client device 140a) may upload UGC, such as a photo or a textual post, to the social network. The user may perform other user actions on the social network, which may be stored in the server 120 or the data repository 110 as user activity data. FIG. 2A illustrates a conceptual example of a user activity data 200.

The user activity data 200 may include a first user action 210a and a second user action 210b. The first user action 210a and the second user action 210b may comprise UGC, such as uploading a photo, uploading text (as in a post), responding or resharing another user's UGC, etc. The first user action 210a and the second user action 210b may further comprise metadata or other additional data, such as location associated with the user action, a subject matter associated with the user action, a timestamp associated with the user action, or other metrics (e.g. number of comments, number of views, frequency of posts, etc.) related to the user action. In certain implementations, the first user action 210a and the second user action 210b may correspond to other user actions or behaviors the user may wish to share. For instance, the first user action 210a and the second user action 210b may correspond to music (e.g. tracks listened to), literature (e.g. books bought or read), live performances attended (e.g. concerts or theater shows), crafting, gaming, cooking, TV watching, movie watching, sports playing or viewing, web pages visited, or other interests the user may wish to share.

Secondary data 212a, secondary data 212b, and secondary data 212c are associated with the first user action 210a. Secondary data 212d is associated with the second user action 210b. The secondary data 212a-212d may include external interactions (e.g. UGC from other users) relating to the first user action 210a or the second user action 210b, such as comments, replies, photos, or other content. The secondary data 212a-212d may further include metadata or additional data as described above. In one example, the first user action may have 3 comments/reshares (represented by the secondary data 212a-212c) and the second user action may have 1 comment/reshare (represented by the secondary data 212d). In certain implementations, the secondary data 212a-212d may include other related data depending on the first user action 210a and the second user action 210b. For example, the secondary data 212a-212d may correspond to genres (e.g. for music, books, shows, etc.)

Figure 2B:
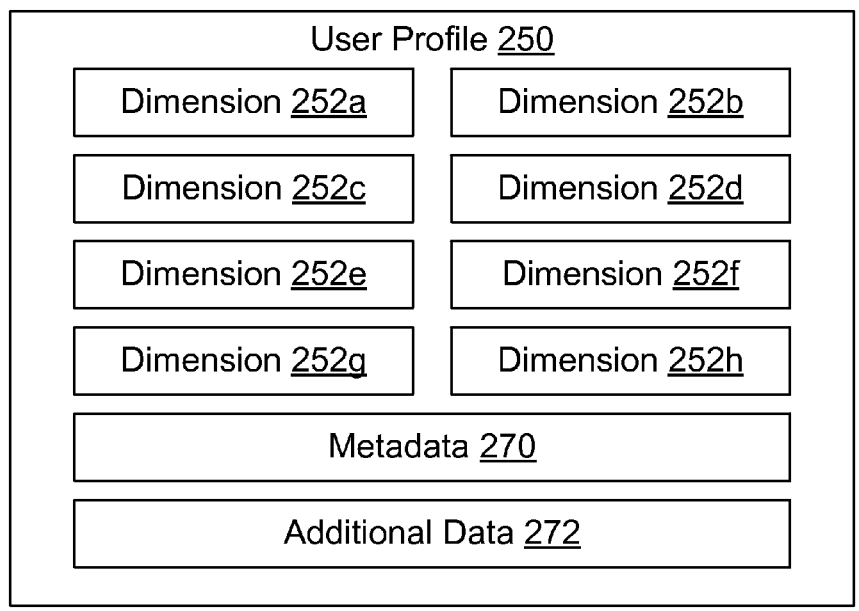
FIG. 2B illustrates a user profile according to example aspects of the present disclosure.

FIG. 2B illustrates an example of a user profile 250. The user profile 250 includes dimension 252a, dimension 252b, dimension 252c, dimension 252d, dimension 252e, dimension 252f, dimension 252g, dimension 252h, metadata 270, and additional data 272. Although the user profile 250 is shown with 8 dimensions 252a-252h, in other implementations the user profile 250 may have more or fewer dimensions. As will be described further below, the dimensions 252a-252h may correspond to categories for defining a user profile, such as personality categories. The metadata 270 or additional data 272 may include metadata and additional data as described above, and may further include other aggregate data, for example a count of user actions, a rate of user activity, other geographic data, and other valuations or categorizations of user activity.

In one implementation, the user profile 250 may relate to a "foodie personality." In a "Foodie Personality" profile, dimension 252a may correspond to "Category Expert," dimension 252b may correspond to "Influencer," dimension 252c may correspond to "Explorer," dimension 252d may correspond to "Omnivore," dimension 252e may correspond to "Local Expert," dimension 252f may correspond to "Loyal Customer," dimension 252g may correspond to "Traveler," and dimension 252h may correspond to "Endurance Athlete."

In one implementation, the user profile 250 may relate to a "music personality." In a "Music Personality" profile, dimension 252a may correspond to "Genre Depth," dimension 252b may correspond to "Genre Diversity," dimension 252c may correspond to "Track/Album Depth," dimension 252d may correspond to "Frequency of Listening," dimension 252e may correspond to "Duration of Listening," dimension 252f may correspond to "Critic," dimension 252g may correspond to "Influencer," and dimension 252h may correspond to "Explorer."

User actions, such as the first user action 210a of the second user action 210b, may be associated with each category based on different criteria or triggers. A user action may fit into more than one category, or may be part of a cumulative value for a category. For the "foodie personality," Category Expert relates to the amount of activity (posts, reviews) in a single category of food (burgers, noodles, etc.). Influencer relates to the amount of social actions generated by other users in response to the subject user's posts (comments on posts, reshares, responses). Explorer relates to the number of new places posted. Omnivore relates to the number of different food categories posted. Local Expert relates to number of posts within the same geographic region/location. Loyal Customer relates to the number of places frequently visited (such as the number of restaurants visited 3+ times). Traveler refers to the number of different geographic regions/locations posted. Endurance Athlete refers to the number of consecutive days posted.

For the "music personality," Genre Depth relates to the genre of music the user most commonly listens to (e.g. listening mainly to jazz versus classical versus indie rock). Genre Diversity relates to the number of different genres the user listened to. Track/Album Depth relates to the number of times the user listens to the same track. Frequency of Listening refers to how often the user listens to music, such as daily. Duration of Listening relates to the length of time the user listens to music, such as a 10 hour marathon. Critic relates to the number of reviews the user submitted, or the number of albums/tracks the user shared socially. Influencer relates to the number of other users who listen to the user's suggested tracks. Explorer relates to the amount of relatively unknown music the user listens to, which may be determined through sales or listening databases or long tail statistical distribution.

The categories may be further augmented with achievement ladders, which reward users with badges based on reaching category-specific milestones. In addition, there may be other achievement ladders and badges based on combinations or sub-combinations of categories. In certain implementations, the user may have more than one profile, such as a "foodie personality" and a "music personality." These profiles may be further aggregated, for example by having additional achievement ladders associated with categories from different profiles, such as the "Influencer" category from the "foodie personality" and the "music personality." Alternatively, an additional profile may be based on a combination of different profiles, such as an "Influencer Personality" based on the "Influencer" categories of different personality profiles.

Figure 3:
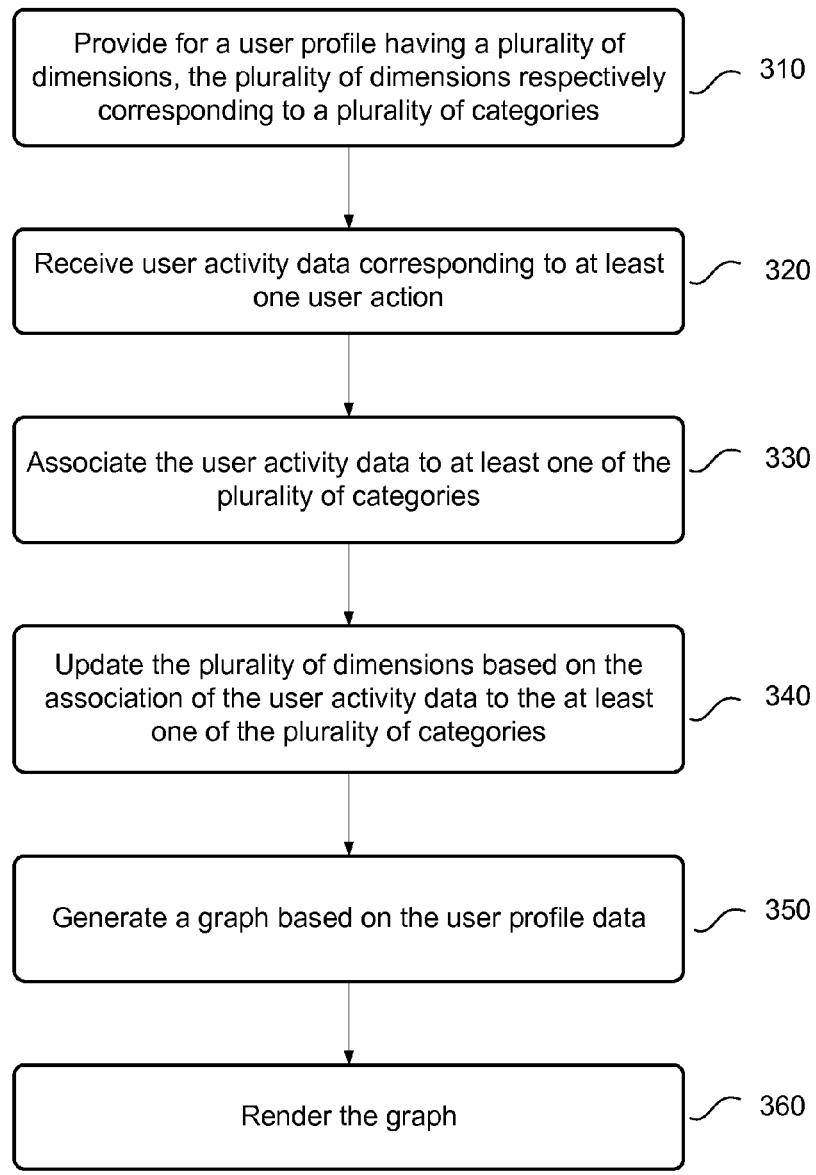
FIG. 3 shows a flowchart for updating a user profile according to example aspects of the present disclosure.

FIG. 3 presents a flowchart 300 of a process for generating a personality profile, such as the user profile 250, from user activity data, such as the user activity data 200. At 310, a user profile, such as the user profile 250, is provided, having a plurality of dimensions, such as dimensions 252a-252h. The plurality of dimensions correspond to a plurality of categories, such as the "foodie personality" categories described above. In certain implementations, each of the plurality of dimensions may correspond to more than one category or sub-category, such that a category or aspects of the category may be represented by more than one dimension.

At 320, user activity data, such as the user activity data 200, corresponding to at least one user action, such as the first user action 210a or the second user action 210b, is received. At 330, the user activity data is associated with at least one of the plurality of categories. Depending on the criteria for each category and the user activity data provided, the user activity data may be associated to more than one category.

At 340, the plurality of dimensions are updated based on the association of the user activity data to the at least one of the plurality of categories. In one implementation, each user action may receive a score for its area and category. The score may be calculated as the product of a quality score, a time decay, and a frequency decay. The quality score may be based on a number of external interactions (representing the influence of the user action on the social network). The time decay may be the inverse of the user action's age, such as 1/# of days old. The frequency delay may be the inverse of the number of posts in a time period, such as 1/nth post in category or area on the same day. Other metrics may be used to determine the quality and/or influence of the user action. Although the present disclosure describes one process of calculating a score, in other implementations, other calculations may be used.

Each category may also have sub-categories. For example, the Category Expert may include sub-categories of "sushi," "burrito," "hamburger," etc. Association to a category or sub-category may be automated, such as by using calculations or otherwise parsed, an operator may manually attribute user actions to categories, the association may be crowd-sourced (such that other users of the social network indicate the relevant categories), the user may select the categories manually, or a combination of the above.

At 350, a graph, such as a multi-dimensional graph 400 in FIG. 4, may be generated based on the user profile data, discussed further below with respect to FIG. 4. At 360, the graph is rendered. The graph may be rendered and publicly viewable, such as by the user and other users. The user may optionally restrict access to the compass graph to selected users or groups. The user may further wish to modify the graph, such as by adding or removing viewable dimensions, which may be utilized to make further comparisons with other users' graphs. As the user performs more social actions, the graph may dynamically update, such as with an animation. For example, certain milestones may be highlighted with dynamic animation. The user may further view a timeline or animation of the graph to see how the various dimensions have grown over time. The user may also wish to segment his activity based on time or other parameters to see how his compass graph evolved. The dimensions may be rendered in different colors, and distinctive colors or symbols may mark milestone progress along the dimensions.

In addition, the graph may be textually rendered, such that a textual description based on the dimensions is shown. For example, with respect to the "foodie personality," the textual description may be a general summary of notable dimensions, such as "sushi and burrito expert, and traveler." The textual description may further describe achievement levels, such as "Chicago area expert level 4, pizza expert level 3." The textual description may correspond to the highest achieving dimension, such as "15 consecutive day serial contributor," or may correspond to the most recently updated dimension. The textual description may be dynamic, such as providing a real-time scrolling banner of updates to dimensions.

Figure 4A:
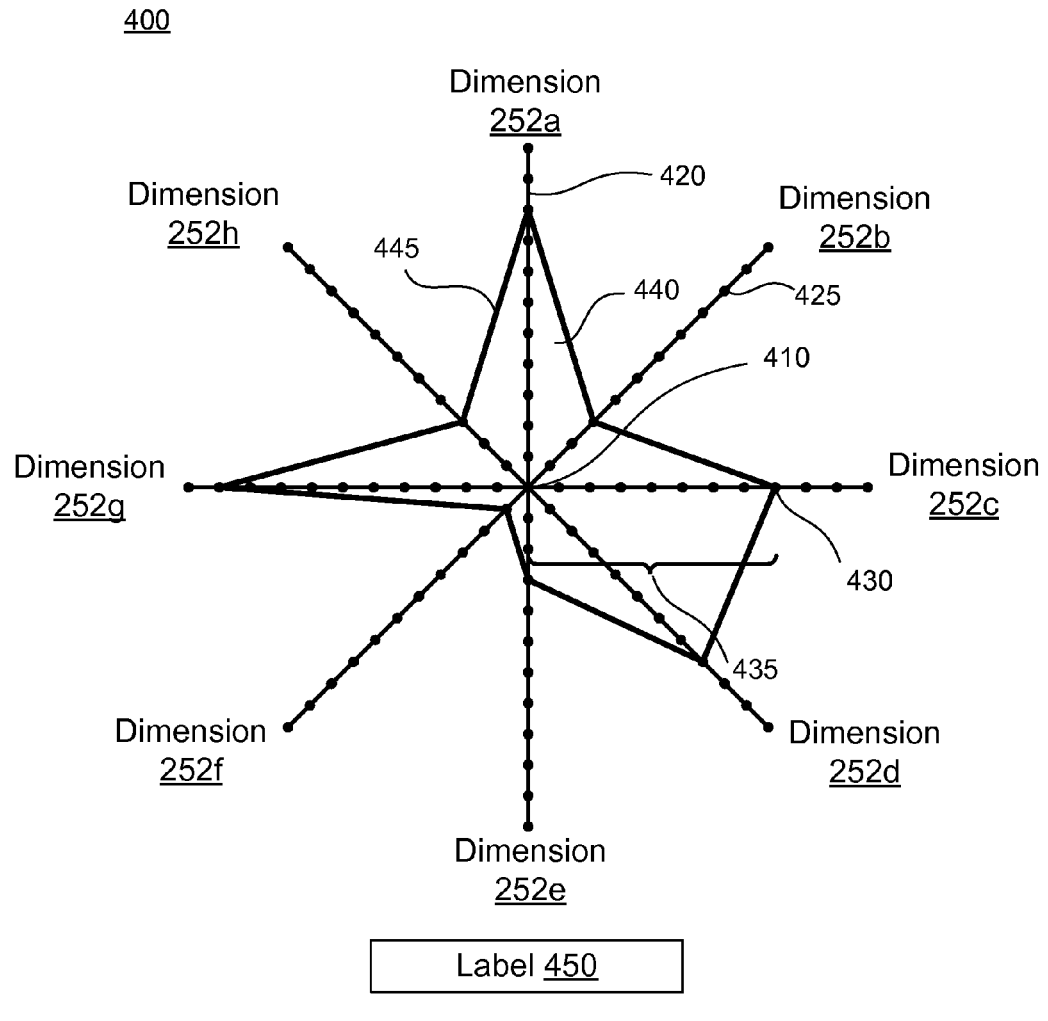
FIG. 4A depicts a multi-dimensional graph according to example aspects of the present disclosure.

FIG. 4A depicts one implementation of a multi-dimensional graph 400. The multi-dimensional graph is a compass graph in FIG. 4A, but may be depicted in other forms, such as concentric circles, or other depictions of multiple scales. The multi-dimensional graph 400 includes a center point 410, from which a plurality of axes 420 radiates outward. In FIG. 4A, the multi-dimensional graph 400 includes 8 axes, each corresponding to different dimensions, but in other implementations there may be more or fewer axes corresponding to more or fewer dimensions (e.g. personality categories). Each axis 420 also includes a dimension point 430, which corresponds to the user's achievement level in the dimension and corresponding category. A distance 435 between the dimension point 430 and the center point 410 indicates a measure of user activity in the corresponding category. The measure of user activity may correlate to an achievement level for that dimension/category. For example, a longer or greater distance 435 may correspond to a higher achievement level, which may further indicate higher user activity in the corresponding category. The axes 420 also include notches or marks 425 which may aid in readability of the multi-dimensional graph 400. Each of dimensions 252a-252h may correspond to different personality categories. The dimensions 252a-252h may be ordered or placed differently around the center point 410.

The axes 420 may be labeled with corresponding category names or symbols, or denoted by different colors. The marks 425 may be distinctive colors or symbols/badges indicating milestone progress along the dimension. In certain implementations, the marks 425 may be rendered dynamically, for example a pulsating mark 425 may indicate the user nearing a milestone. A label 450 may be a general label, such as the user's username or other identification, or may be a textual description as described above.

The axes 420 on the multi-dimensional graph 400 may be based on a scale. Each user action increases the user's achievement level in one or more categories, as described above, which moves the relevant dimension points 430 further from the center point 410. The axes 420 may be based on a linear scale. For example, each action may be multiplied by a weight or other scalar value to move the dimension point 430. In general, the dimension points do not move negatively, or back towards the center point 410, although in certain implementations the dimension points 430 may move towards the center point 410 (such as a time decay). The axes 420 may be based on non-linear scale. For example, the non-linear scale may be a polynomial square, such as the square root of a scalar quantity or value, or a modified logarithmic scale. With a non-linear scale, the marginal return for a single action along any single axis 420 may diminish, requiring more actions to move along the scale as that particular dimension grows. Depending on a desired rate or speed of growth along an axis 420, the scale may be linear, non-linear, or a combination. In addition, the scale may vary or change based on milestones reached, and the axes 420 may have different scales. The dimension points 430 of adjacent axes 420 may be connected by lines 445, as seen in FIG. 4A. The size of a contained area 440 contained in the lines 445 may be an indication of the user's total level of activity.

Different users' multi-dimensional graphs 400 can be compared, such as through normalization and standard deviation, to find people who are similar in personality. A subset of axes 420 may be compared for further analysis.

Figure 4B:
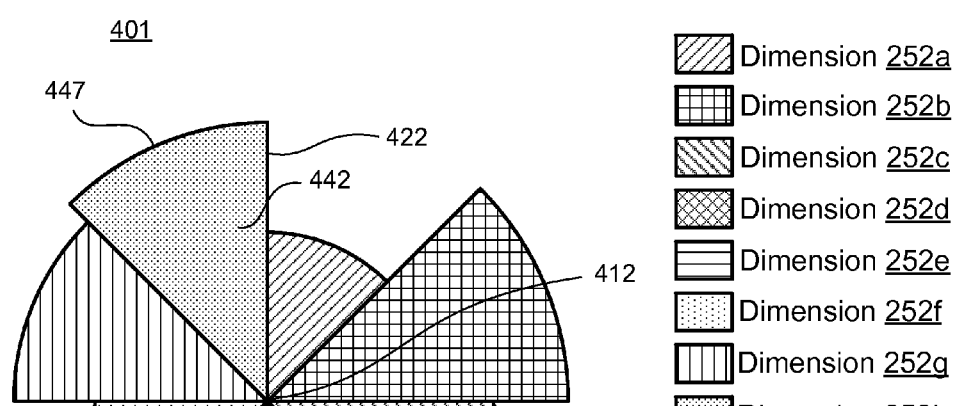
FIG. 4B depicts another multi-dimensional graph according to example aspects of the present disclosure.

FIG. 4B depicts another implementation of a multi-dimensional graph 401. The multi-dimensional graph is a circular chart in FIG. 4B, but may be depicted in other forms. The multi-dimensional graph 401 may be another representation of the multi-dimensional graph 400. The multi-dimensional graph 401 includes a center point 412, from which a plurality of axes 422 radiates outward. However, the axes 422 may not be fully depicted as in FIG. 4A. A dimension point 432 corresponds to a distance or radius 437 from the center point 412. Each dimension point 432 corresponds to the user's achievement level in the dimension and corresponding category. The radius 437 indicates a measure of user activity in the corresponding category. The measure of user activity may correlate to an achievement level for that dimension/category. For example, a longer or greater radius 437 may correspond to a higher achievement level, which may further indicate higher user activity in the corresponding category. For each axis 422, two radii 437 (with one radii 437 along the axis 422 and the other radii 437 along a neighboring or adjacent axis 422), are connected by an arc 447 to form a sector 442. Each sector 442 may correspond to each dimension. The sectors 442 may correspond to the contained areas 440 of FIG. 4A, and may similarly indicate the user's total level of activity. In FIG. 4B, the multi-dimensional graph 401 includes 8 sectors, each corresponding to different dimensions, but in other implementations there may be more or fewer sectors corresponding to more or fewer dimensions (e.g. personality categories). Each of dimensions 252a-252h may correspond to different personality categories. The dimensions 252a-252h may be ordered or placed differently around the center point 412. Each of dimensions 252a-252h may also be represented by different patterns, colors, or other visual indicators for each sector 442, as seen in FIG. 4B. The patterns may also be selected to match a visual theme related to the categories. For example, in the foodie personality each sector 442 may be filled with food-based designs, such as pizza slices with various toppings, pie slices, cake slices, etc. For the music personality, the sectors 442 may be filled with music-themed designs, such as vinyl records, compact discs, etc. In certain implementations, the user may have the option to select the designs or patterns for each sector 442. For example, upon reaching a specific milestone in a category (e.g. a threshold size or radius of the sector), the user may be given the option of additional pizza toppings to decorate the corresponding sector 442.

In certain implementations, the sectors 442 may be rendered dynamically, for example the sector 442 may be animated by "sweeping out" from one axis 422 to the next axis 442. A sector 442 may be exploded out for further viewing (e.g., presenting an exploded view in response to a user selection of the sector). A label 452 may be a general label, such as the user's username or other identification, or may be a textual description as described above.

The axes 422 on the multi-dimensional graph 401 may be based on a scale, with each user action increasing the dimension point 432, as described herein. In addition, although the axes 422 are described as aligning with the edges (e.g. radii 437) of each sector 442, the axes 442 may be elsewhere, such as a midpoint, along the arc 447.

FIG. 5 conceptually illustrates an example electronic system with which some implementations of the subject technology can be implemented. Electronic system 500 can be a computer, phone, PDA, or any other sort of electronic device. Such an electronic system includes various types of computer readable media and interfaces for various other types of computer readable media. Electronic system 500 includes a bus 510, processing unit(s) 560, a system memory 530, a read-only memory (ROM) 550, a permanent storage device 520, an input device interface 570, an output device interface 540, and a network interface 580.

The bus 510 collectively represents all system, peripheral, and chipset buses that communicatively connect the numerous internal devices of electronic system 500. For instance, the bus 510 communicatively connects the processing unit(s) 560 with the ROM 550, system memory 530, and permanent storage device 520.

From these various memory units, the processing unit(s) 560 retrieves instructions to execute and data to process in order to execute the processes of the present disclosure. The processing unit(s) 560 can be a single processor or a multi-core processor in different implementations.

The ROM 550 stores static data and instructions that are needed by the processing unit(s) 560 and other modules of the electronic system. The permanent storage device 520, on the other hand, is a read-and-write memory device. This device is a non-volatile memory unit that stores instructions and data even when electronic system 500 is off. Some implementations of the subject disclosure use a mass-storage device (for example, a magnetic or optical disk and its corresponding disk drive) as the permanent storage device 520.

Other implementations use a removable storage device (for example, a floppy disk, flash drive, and its corresponding disk drive) as the permanent storage device 520. Like the permanent storage device 520, the system memory 530 is a read-and-write memory device. However, unlike the storage device 520, the system memory 530 is a volatile read-and-write memory, such as a random access memory. The system memory 530 stores some of the instructions and data that the processing unit(s) 560 needs at runtime. In some implementations, the processes of the present disclosure are stored in the system memory 530, the permanent storage device 520, or the ROM 550. For example, the various memory units include instructions for receiving user activity data and updating dimensions in accordance with some implementations. From these various memory units, the processing unit(s) 560 retrieves instructions to execute and data to process in order to execute the processes of some implementations.

The bus 510 also connects to input device interface 570 and output device interface 540. The input device interface 570 enables the user to communicate information and select commands to the electronic system. Input devices used with input device interface 570 include, for example, alphanumeric keyboards and pointing devices (also called "cursor control devices"). The output device interface 540 enables, for example, the display of images generated by the electronic system 500. Output devices used with the output device interface 540 include, for example, printers and display devices, for example, cathode ray tubes (CRT) or liquid crystal displays (LCD). Some implementations include devices, for example, a touchscreen that functions as both input and output devices.

Finally, as shown in FIG. 5, the bus 510 also couples the electronic system 500 to a network (not shown) through the network interface 580. In this manner, the computer can be a part of a network of computers (for example, a local area network (LAN), a wide area network (WAN), or an Intranet, or a network of networks, for example, the Internet. Any or all components of electronic system 500 can be used in conjunction with the present disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A computer-implemented method, comprising:
providing a user profile, the user profile having a plurality of dimensions respectively corresponding to a plurality of categories;
receiving user activity data corresponding to at least one user action;
associating the user activity data to at least one of the plurality of categories;
updating the plurality of dimensions within the user profile based on the association of the user activity data to the at least one of the plurality of categories; and
generating, by a processing unit, a graph based on the updated user profile;
wherein the graph includes:
a point;
a plurality of axes radiating outward from the point, the plurality of axes respectively corresponding to the plurality of dimensions;
a plurality of dimension points, each of the plurality of dimension points plotted along each of the plurality of axes respectively, wherein a distance between each of the dimension points and the point corresponds to a measure of user activity in each of the plurality of categories respectively; and
a contained area designated based on the plurality of dimension points, wherein the contained area corresponds to a total user activity level.

2. The computer-implemented method of claim 1, wherein the graph further includes a plurality of lines connecting the plurality of dimension points in adjacent axes of the plurality of axes, the plurality of lines designating the contained area.

3. The computer-implemented method of claim 1, wherein the plurality of axes are based on a linear scale such that successive user actions increase the distance between the corresponding dimension point and the point.

4. The computer-implemented method of claim 3, wherein the plurality of axes are based on a non-linear scale such that the increase to the distance diminishes for each successive user action.

5. The computer-implemented method of claim 1, wherein the user activity data further corresponds to a count of user actions.

6. The computer-implemented method of claim 1, wherein the user activity data further corresponds to a rate of user activity.

7. The computer-implemented method of claim 1, wherein the user activity data further corresponds to a location associated with the at least one user action.

8. The computer-implemented method of claim 1, wherein the user activity data further corresponds to a subject matter associated with the at least one user action.

9. The computer-implemented method of claim 1, wherein the user activity data further corresponds to at least one external interaction associated with the at least one user action.

10. The computer-implemented method of claim 1, wherein the graph further includes a pair of radii connected by an arc to form a sector for each of the plurality of dimension points, the sectors designating the contained area.

11. A non-transitory machine-readable medium comprising instructions stored therein, which when executed by a machine, cause the machine to perform operations comprising:
providing a user profile having a plurality of dimensions, the plurality of dimensions respectively corresponding to a plurality of categories;
receiving user activity data corresponding to at least one user action;
associating the user activity data to at least one of the plurality of categories;
updating the plurality of dimensions based on the association of the user activity data to the at least one of the plurality of categories; and
generating a graph based on the user profile;
wherein the graph includes:
a point;
a plurality of axes radiating outward from the point, the plurality of axes respectively corresponding to the plurality of dimensions;
a plurality of dimension points, each of the plurality of dimension points plotted along each of the plurality of axes respectively, wherein a distance between each of the dimension points and the point corresponds to a measure of user activity in each of the plurality of categories respectively; and
a contained area designated based on the plurality of dimension points, wherein the contained area corresponds to a total user activity level.

12. The non-transitory machine-readable medium of claim 11, wherein the graph further includes a plurality of lines connecting the plurality of dimension points in adjacent axes of the plurality of axes, the plurality of lines designating the contained area.

13. The non-transitory machine-readable medium of claim 11, wherein the plurality of axes are based on a linear scale such that successive user actions increase the distance between the corresponding dimension point and the point.

14. The non-transitory machine-readable medium of claim 11, wherein the plurality of axes are based on a non-linear scale such that an increase to the distance diminishes for each successive user action.

15. The non-transitory machine-readable medium of claim 11, wherein the graph further includes a pair of radii connected by an arc to form a sector for each of the plurality of dimension points, the sectors designating the contained area.

16. A system, comprising:
one or more processors; and
a non-transitory computer-readable medium comprising instructions stored therein, which, when executed by the one or more processors, cause the one or more processors to perform operations comprising:
providing a user profile having a plurality of dimensions, the plurality of dimensions respectively corresponding to a plurality of categories;
receiving user activity data corresponding to at least one user action;
associating the user activity data to at least one of the plurality of categories;
updating the plurality of dimensions based on the association of the user activity data to the at least one of the plurality of categories; and
generating a graph based on the user profile;
wherein the graph includes:
a point;

a plurality of axes radiating outward from the point, the plurality of axes respectively corresponding to the plurality of dimensions;

a plurality of dimension points, each of the plurality of dimension points plotted along each of the plurality of axes respectively, wherein a distance between each of the dimension points and the point corresponds to a measure of user activity in each of the plurality of categories respectively; and a contained area designated based on the plurality of dimension points, wherein the contained area corresponds to a total user activity level.

17. The system of claim 16, wherein the graph further includes a plurality of lines connecting the plurality of dimension points in adjacent axes of the plurality of axes, the plurality of lines designating the contained area.

18. The system of claim 16, wherein the plurality of axes are based on a linear scale such that successive user actions increase the distance between the corresponding dimension point and the point.

19. The system of claim 16, wherein the plurality of axes are based on a non-linear scale such that an increase to the distance diminishes for each successive user action.

20. The system of claim 16, wherein the graph further includes a pair of radii connected by an arc to form a sector for each of the plurality of dimension points, the sectors designating the contained area.

* * * * *